United States Patent [19]

Miya

[11] 3,946,169

[45] Mar. 23, 1976

[54] BILATERAL SIGNAL TRANSMISSION SYSTEM
[75] Inventor: Kenichi Miya, Musashino, Japan
[73] Assignee: Kokusai Denwa Kabushiki Kaisha, Japan
[22] Filed: July 25, 1974
[21] Appl. No.: 491,923

[30] Foreign Application Priority Data
July 28, 1973  Japan .................................. 48-85262

[52] U.S. Cl. ......................... 179/170 R; 179/170 D
[51] Int. Cl.² ........................ H04B 1/52; H04B 3/36
[58] Field of Search .......... 179/170 R, 170 D, 16 E, 179/81 B; 333/11

[56] References Cited
UNITED STATES PATENTS

| 1,697,933 | 1/1929 | Shackleton ...................... 179/170 D |
| 1,780,962 | 11/1930 | Bailey et al. ..................... 179/170 D |
| 2,282,465 | 5/1942 | Edwards .......................... 179/170 D |
| 2,870,246 | 1/1959 | Hallden et al. .................. 179/170 R |
| 2,924,673 | 2/1960 | Duinker ........................... 179/170 D |
| 3,778,563 | 12/1973 | Bise et al. ....................... 179/170 D |
| 3,848,098 | 11/1974 | Pinel ............................... 179/170 D |

Primary Examiner—Kathleen H. Claffy
Assistant Examiner—Randall P. Myers
Attorney, Agent, or Firm—Robert E. Burns; Emmanuel J. Lobato; Bruce L. Adams

[57] ABSTRACT

A bilateral transmission system for bilateral signal transmission through a two-way transmission line, in which a plurality of first bilateral transmission circuits and a plurality of second bilateral transmission circuits are alternately inserted in the two-way transmission line at substantially regular intervals. The first bilateral transmission circuit is formed by a first amplifier for transmitting the signal in the forward direction, a first by-pass line for transmitting the signal in the reverse direction and at least one first hybrid circuit for connecting the first amplifier and the first by-pass line to the two-way transmission line. The second bilateral transmission circuit is formed by a second amplifier for transmitting the signal in the reverse direction, a second by-pass line for transmitting the signal in the forward direction and at least one second hybrid circuit for connecting the second amplifier and the second by-pass line to the two-way transmission line.

3 Claims, 7 Drawing Figures

BILATERAL SIGNAL TRANSMISSION SYSTEM

This invention relates to a bilateral transmission system for bilateral, simultaneous signal transmission over the entire frequency band of a two-wire transmission line.

For bilateral transmission on a conventional two-wire, cable transmission system, there is known a method in which the frequency band is divided by a band-pass filter into two parts for the transmission in the forward direction and that in the reverse direction, and another method in which transmission is achieved over the entire frequency band in both directions by the use of hybrid circuits such as three-winding transformers. However, the former method is defective in that a complicated band division circuit is required and in that only one half the frequency band is utilized. On the other hand, the latter method is simple in the construction of a circuit therefor but defective in that impracticability of complete matching in the hybrid circuit leads to crosstalk, which results in the impossibility of sufficient enhancement of the gain of a repeater and, also, in the deterioration of signal quality.

An object of this invention is to provide a bilateral transmission system which ensures stable bilateral transmission over the entire frequency band by the use of a simple circuit construction.

In accordance with the principle of this invention, the function of an ordinary bilateral amplifier used in a two-wire transmission line is divided into two. First bilateral transmission circuits are each provided to transmit signals through an amplifier and a by-pass line in forward and reverse directions, respectively. Second bilateral transmission circuits are each provided to transmit the signals through a bypass line and an amplifier in the forward and reverse directions, respectively. The first bilateral transmission circuits and the second bilateral transmission circuits are alternately inserted in a two-way transmission line at regular intervals. As a result of the above construction, the loop gain of each closed circuit of the first bilateral transmission circuit and the second bilateral transmission circuit is lowered to reduce the level of the crosstalk therein.

The principle, construction and operations of this invention will be clearly understood from the following detailed description taken in conjunction with the accompanying drawings, in which.

This invention will hereinafter be described in detail in comparison with a conventional system.

Figure 1:
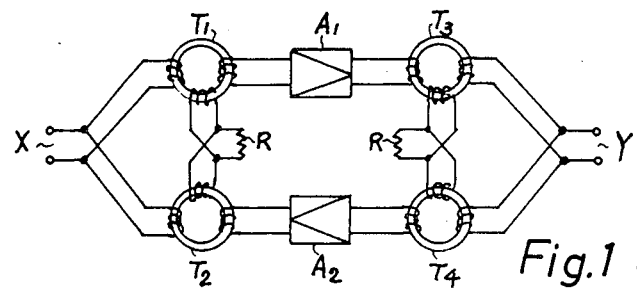
FIG. 1 is a circuit diagram illustrating an example of a conventional bilateral repeater.

FIG. 1 illustrates an example of a conventional bilateral transmission circuit using three-winding transformers. Namely, a pair of three-winding transformers $T_1$ and $T_2$ and a pair of three-winding transformers $T_3$ and $T_4$ have the same construction and are provided at the input side X and the output side Y of a line, respectively, so that transmission is effected by amplifiers $A_1$ and $A_2$ in the forward direction and the reverse direction. Reference character R indicates matching resistances equivalent to the line impedance. As is known in the art, such bilateral amplifier is intended to achieve transmission only in the four-wire paths but to prevent crosstalks in a closed loop circuit provided at the four-wire section.

Figure 2:
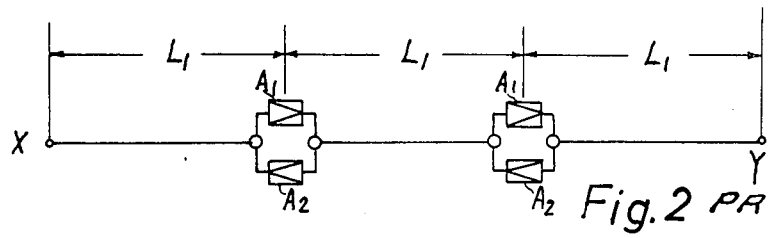
FIG. 2 is a connection diagram illustrating an example of a transmission system using conventional bilateral amplifiers.

FIG. 2 shows a two-wire line where the conventional bilateral transmission circuits mentioned above are inserted in the line at predetermined intervals $L_1$ for bilateral transmission. In FIG. 2, hybrid circuits are identified by small circles (the same is true of the following). If the line impedance is regarded as a constant resistance while matching is sufficiently achieved by the matching resistances R, there is no problem in bilateral transmission. In practice, however, crosstalks result from incomplete matching of the hybrid circuits and inequality of the characteristics of the circuit elements so that an oscillation is caused in the closed loop circuit including the amplifiers. This imposes a limitation on the gain of each amplifier, so that an optimum design of the overall transmission system cannot be obtained. This will hereinbelow be theoretically described.

In the conventional system shown in FIG. 2, if a signal voltage at the input of a certain bilateral transmission circuit is taken as Er, if the amplification factors of the amplifiers $A_1$ and $A_2$ are taken as G and if the amount of crosstalk loss of each hybrid circuit is taken as H, a crosstalk voltage $E_c$ at the input of each amplifier is expressed by the following equation in the form of decibel indication:

$$E_c = E_r + 2(G - H) \text{ (dB)}$$

Accordingly, in order to prevent oscillation, it is necessary to design the circuit under at least a condition: $E_c < E_r$, that is, $G < H$ and there exists in a realizable value of G a limit value $G = H$.

Figure 3A:
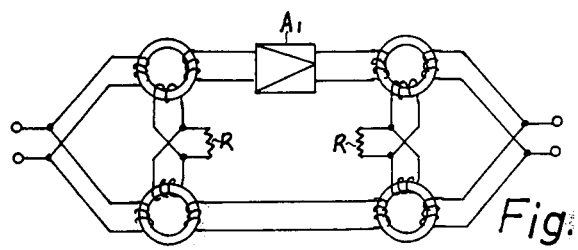
FIG. 3A is a circuit diagram illustrating an example of a first bilateral transmission circuit employed in this invention.
Figure 3B:
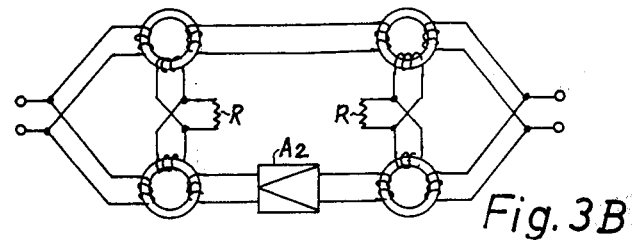
FIG. 3B is a circuit diagram illustrating an example of a second bilateral transmission circuit employed in this invention.

To overcome the above defect in accordance with this invention, the bilateral transmission circuit is divided into a first bilateral transmission circuit, in which transmission in the forward direction is effected through a first amplifier and that in the reverse direction is effected through a by-pass line, and into a second bilateral transmission circuit, in which transmission in the reverse direction is achieved through a second amplifier and that in the forward direction is achieved through a by-pass line, as shown in FIGS. 3A and 3B, respectively. These two kinds of bilateral transmission circuits are alternately inserted in a two-way transmission line at regular intervals as shown in FIG. 4.

Figure 4:
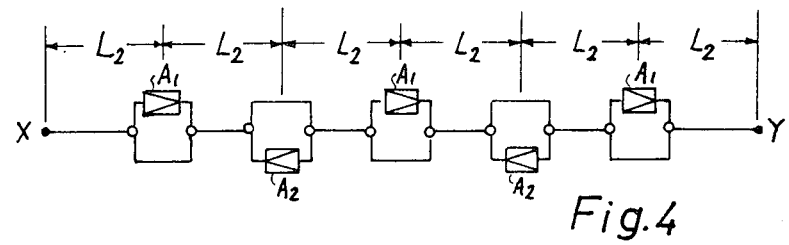
FIG. 4 is a connection diagram illustrating an example of this invention.

In FIG. 4 exemplifying this invention, a voltage $E_{c1}$ which directly crosstalks to the input terminal of a closed circuit of a certain bilateral transmission circuit inserted in the line is given as follows:

$$E_{c1} = E_r + G - 2H \text{ (dB)}$$

Namely, the limited value of the amplification factor is such that G=2H and the maximum condition for the amplifier is higher by a value H than in the case of the conventional system.

However, it must be noted that the crosstalk voltage is composed mainly of such a component that a signal amplified by one amplifier is transmitted to the bilateral transmission circuit of an n-th preceding or succeeding stage inserted in the line after being attenuated while one portion of the transmitted signal is amplified therein as a crosstalk voltage and fed back to the input side of the instant amplifier through the same line after being attenuated.

In FIG. 2 showing the conventional system, if the attenuation of the line of the length $L_1$ is taken as $L_1$dB and if the amplification factor $G_1$ of each amplifier is equal to the line loss, that is, $G_1 = L_1$, a crosstalk voltage $E_{c2}$ of each amplifier is given as follows:

$$E_{c2} = Er + 2 (L_1 - H)$$

Next, in FIG. 4 showing this invention, if the loss of the line of a length $L_2$ is taken as $L_2$dB, the voltage $E_{c2}$ is given as follows:

$$E_{c2} = Er + 2(L_2 - H)$$

because the amplification factor G2 of each amplifier is such that $G_2 = 2L_2$.

In a case where the amplifiers are inserted in the line at regular intervals according to the prior art and this invention, respectively, that is, in a case where $L_1 = L_2 = L$ and in a case where $G_2 = 2G_1$, the oscillation condition is that L= H in both cases. This indicates that the system of this invention can double the gain of each amplifier and reduce the number of the amplifiers by 1/2 as compared with the prior art system.

In a case where the total numbers of amplifiers used in the prior art system and the system of this invention are equal to each other, that is, in a case where $L_1 = 2L_2 = 2L$ or $G_1 = G_2$, the oscillation conditions are 2L = H and L = H in the prior art system and in this invention system, respectively. This indicates that the system of this invention makes the oscillation condition margin easier than the prior art system to facilitate the design and fabrication correspondingly.

This invention utilizes the line loss L and it is not always necessary to insert the amplifiers in the line at exactly the same intervals but sufficient only to place them at substantially the same intervals. As described above, this invention is capable of attaining its object with much ease as compared with the prior art.

Figure 5:
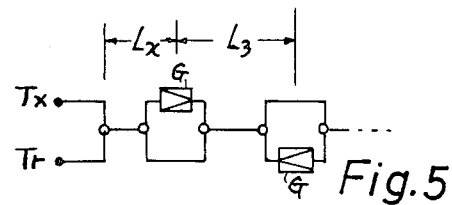
FIG. 5 is a connection diagram illustrating an example of this invention at one end connected to terminal equipment.

Next, a discussion will be made in connection with the signal amplitude separation degree, that is, the signal to interference wave ratio, in the case where signals of the same frequency are simultaneously transmitted from and received at both ends of the line. At the both ends of the line, the transmitted and received signals are usually separated by three-wire transformers from each other. FIG. 5 illustrates an example of its circuit. In FIG. 5, reference characters $T_x$ and $T_r$ denote transmitting and receiving terminals, respectively. Assume that a first transmission circuit from an end is disposed at a distance $L_x$ ($<L_3$) therefrom and that the other transmission circuits are all disposed at regular intervals $L_3$. It is considered that interference waves sent out from the terminal $T_x$ enter into the terminal $T_r$ through several paths, but the interference wave passing through the bilateral transmission circuit is a main one of them. If its intensity is taken as $E_i$, the ratio of the interference wave to the received signal of an intensity $E_r$, that is, $(E_r - E_i)$, is given as follows regardless of the distance $L_x$:

$$E_r - E_i = H - L_3 \text{ (dB)}$$

This relation also holds true in the part of each bilateral transmission circuit of the transmission line. Namely, for enhancement of the separation degree, it is the most important to increase the amount of loss H but it is also effective for enhanced separation degree to design the overall transmission system to thereby reduce the line loss L and the amplification factor G.

The separation degree in the conventional system of FIG. 3 is $H - 2L_3$ and, therefore, the system of this invention is also excellent in respect of the separation degree.

The presence of the interference waves at the ends of the transmission line leads to deterioration of the quality of communication but, on the other hand, by utilizing this property, it is possible to confirm the operative condition of the transmission system or to find a malefunctioning point when the transmission system is faulty, for example, when the line is broken and grounded. Namely, this can be achieved by transmitting a train of sharp pulses from the ends of the line and observing the pulses of substantially constant amplitude fed back from each transmission circuit at intervals of $t = n.2L/v$ (where $v$ is the propagation speed of the pulses in the line and $n$ is an integer) or pulses reflected back from the malefunctioning point. This function cannot be obtained with the conventional system employing a band-pass filter and is a feature obtainable with this invention only.

Finally, a description will be given of the bilateral transmission circuit which is required for the practice of this invention. The bilateral transmission circuit can also be realized by the fundamental circuit shown in FIG. 3 but, from the viewpoint of increasing the value of H, it is desired to make the characteristics of the bilateral transmission circuits uniform and, also, to minimize their loss. Therefore, it is inadvisable to employ such a hybrid circuit system which uses many transformers or resistance elements.

Figure 6:
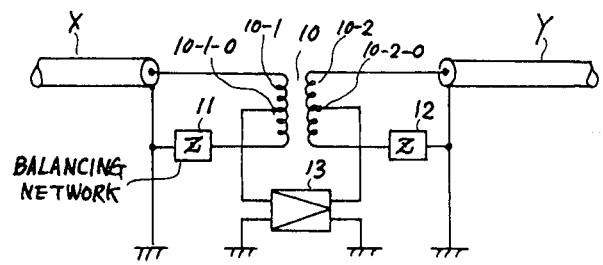
FIG. 6 is a circuit diagram illustrating an example of a repeater employed in a bilateral transmission system of this invention.

FIG. 6 illustrates a hybrid circuit which is simple in structure but excellent in performance, and in which only one transformer 10 having neutral points 10-1-0 and 10-2-0 in its primary and secondary windings 10-1 and 10-2, respectively, is employed. Moreover, its input and output circuits are provided in the form of a bridge circuit with balancing networks 11 and 12, which are equivalent to the respective line impedances of lines X and Y, respectively. Namely, by the coupling of the primary and secondary windings 10-1 and 10-2 of the transformer 10, transmission is effected through the by-pass line between two lines X and Y and, at the same time, a signal is applied to an amplifier 13 through the neutral point 10-1-0 of the primary winding 10-1 and amplified by the amplifier so that the amplified signal is transmitted to the right through the neutral point 10-2-0 of the secondary winding 10-2, as will be seen from the circuit diagram of FIG. 6. Since the amplifier 13 is adapted to utilize the two neutral points 10-1-0 and 10-2-0 of the single transformer 10, the amount of crosstalk loss can be enhanced sufficiently high. The by-pass line or signal path, which is a passive transmission path for transmitting the signal in the reverse direction without amplification is defined, in FIG. 6, by a path through the primary winding 10-1 to the secondary winding 10-2 of the transformer 10.

As described above, the circuit of this invention is designed for efficient transmission with a very simple circuit system by putting together two hybrid circuits which are originally required in the prior art.

The bilateral transmission system of this invention realizes bilateral, simultaneous transmission over the entire frequency band and, also, has advantages from the manufacturing point of view, such as non-use of any complicated band-pass filter and simple circuit construction. In the case of applying this system to the transmission through a submarine cable, since the line characteristics are stable and uniform, it is easy to provide the characteristic that H>45dB and, by selecting that, for example, L = 10 to 20dB, that is, G=20 to 40dB, it is possible to effect transmission whose quality is also practical in the separation degree, in particular, PCM transmission. Further, this invention has also such an advantage that monitoring of the operative condition of the cable system and detection of a malefunctioning point in the case of the line being broken and grounded can be achieved by transmitting pulses from the both ends of the line, and by observing reflected and fed-back pulses, utilizing the crosstalk in the amplifier circuits.

Moreover, this invention is advantageous, in that even if the amplification gain at a certain point in the transmission line is lost by some cause, the circuit is maintained in its connected conductive state through the by-pass line. If the line loss L is designed to be low, to some extent transmission is still maintained when the line is faulty. Therefore, it is effective for enhancement of reliability of the communication circuit.

What I claim is:

1. A bilateral transmission system for bilateral signal transmission through a two-wire transmission line, including a plurality of first bilateral transmission circuits and a plurality of second bilateral transmission circuits which are alternately inserted in the two-way transmission line at substantially regular intervals; said first bilateral transmission circuits each comprising a first amplifier for transmitting the signal in the forward direction, a first passive by-pass line for transmitting the signal in the reverse direction and a first pair of hybrid circuits for connecting said first amplifier and said first by-pass line in parallel and to the two-way transmission line; and said second bilateral transmission circuits each comprising a second amplifier for transmitting the signal in the reverse direction, a second passive by-pass line for transmitting the signal in the forward direction and a second pair of hybrid circuits for connecting said second amplifier and said second by-pass line in parallel and to the two-way transmission line.

2. A bilateral transmission system according to claim 1, in which each hybrid circuit of said first pair of hybrid circuits and said second pair of hybrid circuits comprises two three-winding transformers, which are inserted in the two-way transmission line in pairs to form four-wire transmission lines respectively connected to a corresponding one of said first and second amplifiers and one of said first and second by-pass lines, and to said two-wire transmission line.

3. A bilateral transmission system for bilateral signal transmission through a two-wire transmission line, including a plurality of first bilateral transmission circuits and a plurality of second bilateral transmission circuits which are alternately inserted in the two-way transmission line at substantially regular intervals; said first bilateral transmission circuits each comprising a first amplifier for transmitting the signal in the forward direction, a first passive by-pass signal path for transmitting the signal in the reverse direction and a first pair of hybrid circuits for connecting said first amplifier and said first bypass signal path in parallel and to the two-way transmission line; and said second bilateral transmission circuits each comprising a second amplifier for transmitting the signal in the reverse direction, a second passive by-pass signal path for transmitting the signal in the forward direction and a second pair of hybrid circuits for connecting said second amplifier and said second by-pass signal path in parallel and to the two-way transmission line, and wherein each pair of the hybrid circuits are comprised of a transformer having a primary winding with a neutral tap and a secondary winding with a neutral tap, and a pair of balancing networks for connecting the primary and secondary windings to the two-way transmission line, wherein the primary and secondary windings jointly define said passive by-pass signal path and an amplifier is connected between the neutral taps of the primary and secondary windings for transmitting the signal.

* * * * *